(12) United States Patent
Mayuzumi

(10) Patent No.: US 10,535,113 B2
(45) Date of Patent: Jan. 14, 2020

(54) IMAGE PROCESSING APPARATUS, IMAGE PROCESSING METHOD, AND STORAGE MEDIUM FOR GENERATING A MASK IMAGE

(71) Applicant: CANON KABUSHIKI KAISHA, Tokyo (JP)

(72) Inventor: Ichiko Mayuzumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 15/793,334

(22) Filed: Oct. 25, 2017

(65) Prior Publication Data

US 2018/0122033 A1    May 3, 2018

(30) Foreign Application Priority Data

Nov. 2, 2016 (JP) .................................. 2016-215301
Aug. 2, 2017 (JP) ................................. 2017-149980

(51) Int. Cl.
| G06K 9/00 | (2006.01) |
| G06T 1/00 | (2006.01) |
| G06T 7/11 | (2017.01) |
| G06T 7/70 | (2017.01) |
| G06T 5/50 | (2006.01) |
| G06T 11/00 | (2006.01) |
| H04W 12/02 | (2009.01) |
| G06T 7/90 | (2017.01) |

(52) U.S. Cl.
CPC ............. *G06T 1/0007* (2013.01); *G06T 5/50* (2013.01); *G06T 7/11* (2017.01); *G06T 7/70* (2017.01); *G06T 11/001* (2013.01); *H04W 12/02* (2013.01); *G06T 7/90* (2017.01); *G06T 2207/10024* (2013.01)

(58) Field of Classification Search
CPC . G06T 1/0007; G06T 7/11; G06T 7/70; G06T 7/90; G06T 7/001; G06T 5/50; H04W 12/02
See application file for complete search history.

(56) References Cited

U.S. PATENT DOCUMENTS

| 5,454,050 A * | 9/1995 | Nakabayashi | G03F 1/90 382/165 |
| 7,783,117 B2 * | 8/2010 | Liu | G06K 9/38 382/164 |
| 7,835,045 B2 * | 11/2010 | Nishioka | H04N 1/38 358/1.9 |
| 8,254,672 B2 * | 8/2012 | Matsuoka | H04N 1/642 382/166 |

(Continued)

FOREIGN PATENT DOCUMENTS

| CN | 102708372 A | 10/2012 |
| CN | 104160690 A | 11/2014 |

(Continued)

*Primary Examiner* — Amir Alavi
(74) *Attorney, Agent, or Firm* — Canon U.S.A., Inc. IP Division

(57) ABSTRACT

An image processing apparatus that provides privacy protection and monitoring acquires a background image and a captured image, extracts an object region corresponding to a predetermined object from the captured image, sets a masking color based on color information about the background image, and masks the extracted object region based on the masking color.

16 Claims, 10 Drawing Sheets

(56) References Cited

U.S. PATENT DOCUMENTS

| | | | |
|---|---|---|---|
| 8,384,952 B2* | 2/2013 | Hayasaki | H04N 1/644 345/555 |
| 8,769,395 B2* | 7/2014 | Boliek | G06K 9/00463 382/232 |
| 8,797,619 B2* | 8/2014 | Kido | H04N 1/00363 358/1.18 |
| 9,142,033 B2 | 9/2015 | Feris | |
| 2014/0028794 A1* | 1/2014 | Wu | H04N 5/2226 348/43 |
| 2018/0122033 A1* | 5/2018 | Mayuzumi | G06T 7/11 |

FOREIGN PATENT DOCUMENTS

| | | |
|---|---|---|
| CN | 104380704 A | 2/2015 |
| CN | 105100671 A | 11/2015 |
| CN | 105306884 A | 2/2016 |
| JP | 2009-225398 A | 10/2009 |
| JP | 2010-220042 A | 9/2010 |
| JP | 4578044 B2 | 11/2010 |
| JP | 2012-085137 A | 4/2012 |
| JP | 5834193 B2 | 12/2015 |
| WO | 2007/004974 A1 | 1/2007 |

* cited by examiner

IMAGE PROCESSING APPARATUS, IMAGE PROCESSING METHOD, AND STORAGE MEDIUM FOR GENERATING A MASK IMAGE

BACKGROUND

Field

The present disclosure relates to an image processing apparatus, an image processing method, and a storage medium that are to protect privacy.

Description of the Related Art

Nowadays, a monitor camera is commonly installed while importance of privacy protection of individuals captured in a video of the monitor camera is increasing. Japanese Patent No. 5834193 discusses a technology that uses a result of human body detection to generate a video in which a human body region is masked. Japanese Patent No. 4578044 discusses a technology in which a receiving unit receives outline information about a difference region between images extracted by a monitoring module, composes a composite image of the outline information and a background image, and displays the composite image.

The technology discussed in Japanese Patent No. 5834193 changes a color and a mask pattern of the human body region depending on an attribute of a person, and the changed color can become a color similar to the background image. Therefore, the masked person is not distinguished from the background, which can cause missing of an actually-present person. In the case of the technology discussed in Japanese Patent No. 4578044, the color of the outline information can become similar to the color of the background because the outline information received by the receiving unit is simply overlapped with the background image.

SUMMARY

According to an aspect of the present disclosure, an image processing apparatus includes an acquiring unit configured to acquire a background image and a captured image, an extraction unit configured to extract, from the captured image, an object region corresponding to a predetermined object, and a processing unit configured to set a masking color based on color information about the background image, and to mask the extracted object region based on the masking color.

Further features will become apparent from the following description of exemplary embodiments with reference to the attached drawings.

DESCRIPTION OF THE EMBODIMENTS

Exemplary embodiments are described below based on the attached drawings.

Figure 1:
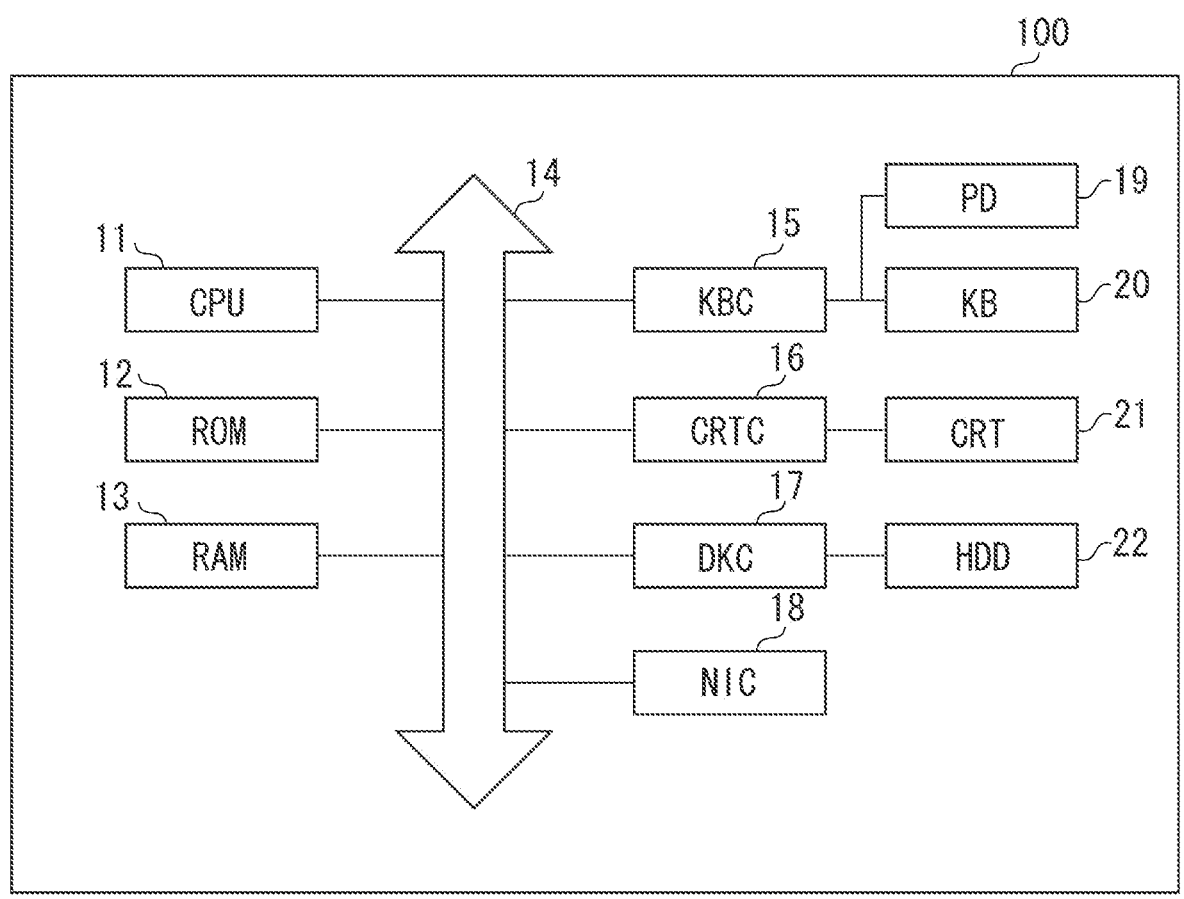
FIG. 1 is a diagram illustrating a hardware configuration of an image processing apparatus.

FIG. 1 is a diagram illustrating an example of a hardware configuration of an image processing apparatus 100.

A central processing unit (CPU) 11 controls various types of devices connected to a system bus 14.

A read-only memory (ROM) 12 stores a program of basic input/output system (BIOS) and a boot program.

A random access memory (RAM) 13 is used as a main storage device of the CPU 11.

A keyboard controller (KBC) 15 performs processing relating to input of information and the like through a pointing device (PD) 19, such as a mouse, and a keyboard (KB) 20.

A display controller (CRTC) 16 includes a video memory therein, and performs drawing on the video memory and outputs, to a cathode-ray tube (CRT) 21, image data drawn in the video memory as a video signal, in response to instruction from the CPU 11. Note that the CRT 21 is one example of a display apparatus in FIG. 1. The display apparatus is not limited to this example, and can be a liquid display apparatus or any other type of display apparatus that would enable practice of the exemplary embodiments.

A disk controller (DKC) 17 accesses a hard disk (HDD) 22.

A network interface card (NIC) 18 is connected to a network and performs information communication through the network.

The HDD 22 is an example of a storage area. Programs of an operating system (OS) and programs of various kinds of applications that are operated on the OS are stored in the HDD 22.

In the above-described configuration, when the image processing apparatus 100 is turned on, the CPU 11 loads the OS programs from the HDD 22 to the RAM 13 based on the boot program stored by the ROM 12, and executes processing to achieve functions of the respective devices.

When the CPU 11 of the image processing apparatus 100 executes the processing based on the programs stored by the ROM 12 or the HDD 22, a software configuration of the image processing apparatus 100 in FIG. 2 and FIG. 8, described below, and processing of flowcharts in FIG. 3, FIG. 7, and FIG. 9, described below, are achieved.

Figure 2:
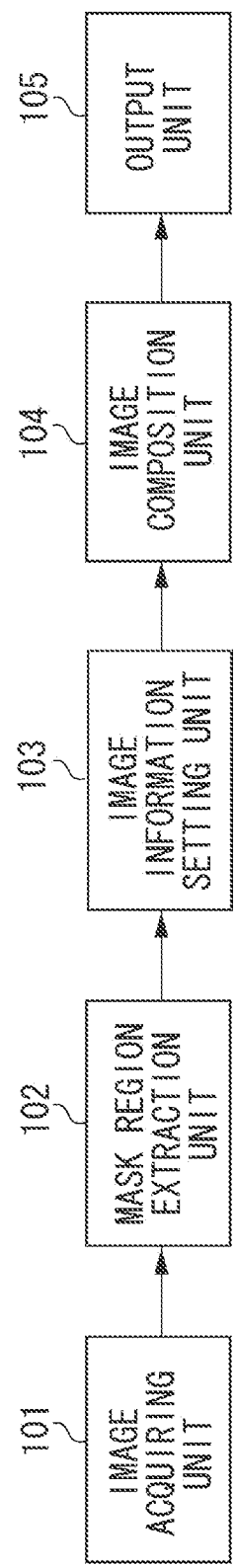
FIG. 2 is a diagram illustrating a software configuration of the image processing apparatus.

FIG. 2 is a diagram illustrating an example of the software configuration of the image processing apparatus 100 according to a first exemplary embodiment. The image processing apparatus 100 includes, as the software configuration, an image acquiring unit 101, a mask region extraction unit 102, an image information setting unit 103, an image composition unit 104, and an output unit 105. The image acquiring unit 101 sequentially acquires images from an image pickup unit of a camera including a lens and a sensor, etc. with predetermined intervals, and provides the images to the mask region extraction unit 102. The image pickup unit can be included in the image processing apparatus 100 or can be communicably connected to the image processing apparatus 100 via the network or the like.

The mask region extraction unit 102 performs processing to extract a mask region of an object that is a privacy protection target. In other words, the mask region extraction unit 102 extracts, from the image, an object region corresponding to a predetermined object, such as a person, and regards the object region as the mask region. The mask region extraction unit 102 extracts the mask region (the object region) from a difference between the image acquired by the image acquiring unit 101 and a background image to be used for extracting a mask region where the object is not present in an image-capturing region of the image pickup apparatus 100. The extraction method is not limited thereto, and the mask region extraction unit 102 can extract the mask region using other methods. The mask region extraction unit 102 provides the extracted mask region and the background image to the image information setting unit 103. At this time, for example, it is assumed that the mask region extraction unit 102 stores image data of only background without the object (hereinafter, referred to as the background image), in the RAM 13, the HDD 22, or the like. The background image is previously acquired by the image acquiring unit 101.

The image information setting unit 103 acquires color information that is image information about the background image, and sets, as a color of the mask region (a masking color), a color that is different from the color indicated by the color information (a color with high visibility and high attractiveness with respect to the color of the background image).

Figure 10A:
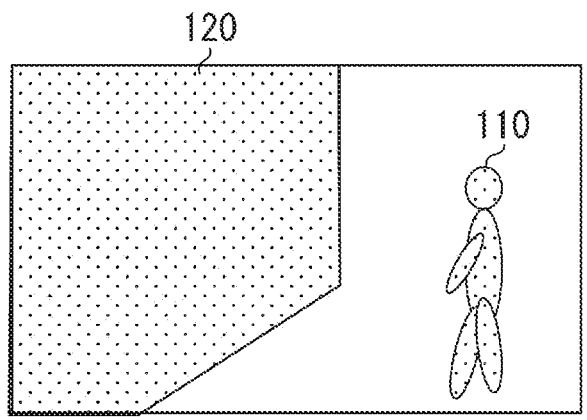
FIGS. 10A to 10C are schematic diagrams illustrating a state in which a masking color is dynamically changed based on movement of the object.
Figure 10B:
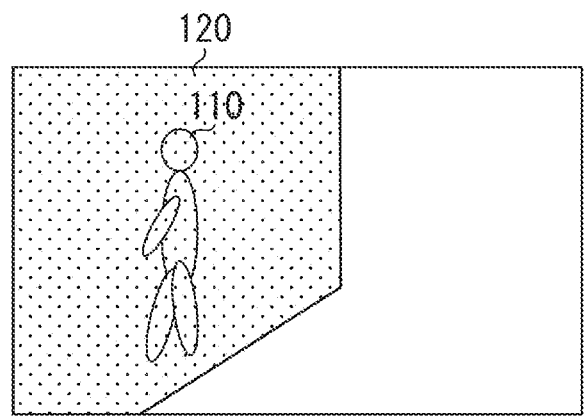
Figure 10C:
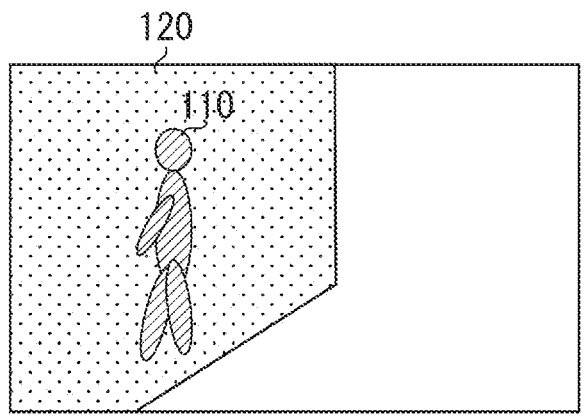

For example, in FIG. 10A, a mask color of an object 110 and a color of the background of the object are different from each other. Therefore, presence of the object is easily grasped. Thereafter, when the object 110 moves and the mask color of the object is similar to the color of a wall 120 or the like as the background as illustrated in FIG. 10B, it is difficult to grasp presence or motion of the object 110. Therefore, as illustrated in FIG. 10C, a corresponding background color is extracted to determine the mask color in order to change the mask color of the object 110 and to facilitate grasping of the presence and the motion of the object 110.

As the color information that is acquired for determination of the color, signal components Y, Cr, and Cb are acquired from the video signal acquired by the image acquiring unit 101, and are converted into RGB signals. Setting, as the color of the mask region, an inverted color or a complementary color with respect to the color extracted from the background image makes discrimination of the object from the background easy. For example, when the value of R in RGB signals is 80, the value of the mask color is calculated from an expression of 255−80=175, and values of other color components are calculated in a similar manner. A well-known method in which a total value of a maximum value and a minimum value among RGB values is determined, and values of respective constituent components are each subtracted from the total value to determine new RGB values, may be used. In addition, since such calculation does not require strict accuracy, a table in which color information with certain accuracy is listed or the like can be used for determination. The image information setting unit 103 generates a mask image in which the mask region is masked with the color of the set color information, and provides, together with the background image, the mask image to the image composition unit 104. In addition, the image information setting unit 103 can, when acquiring the image information about the background image, acquire image information about the region corresponding to the mask region instead of image information about the entire background image.

The image composition unit 104 combines the background image and the mask image (the image for masking processing) to generate a composition image (hereinafter, referred to as a privacy protection image).

The output unit 105 outputs the privacy protection image generated by the image composition unit 104 to an external apparatus or the like that is connected to the image processing apparatus 100 via a cable or radio connection. In addition, the output unit 105 can output the privacy protection image to the HDD 22, the CRT 21, and the like.

Next, a flow of information processing of the image processing apparatus 100 is described.

Figure 3:
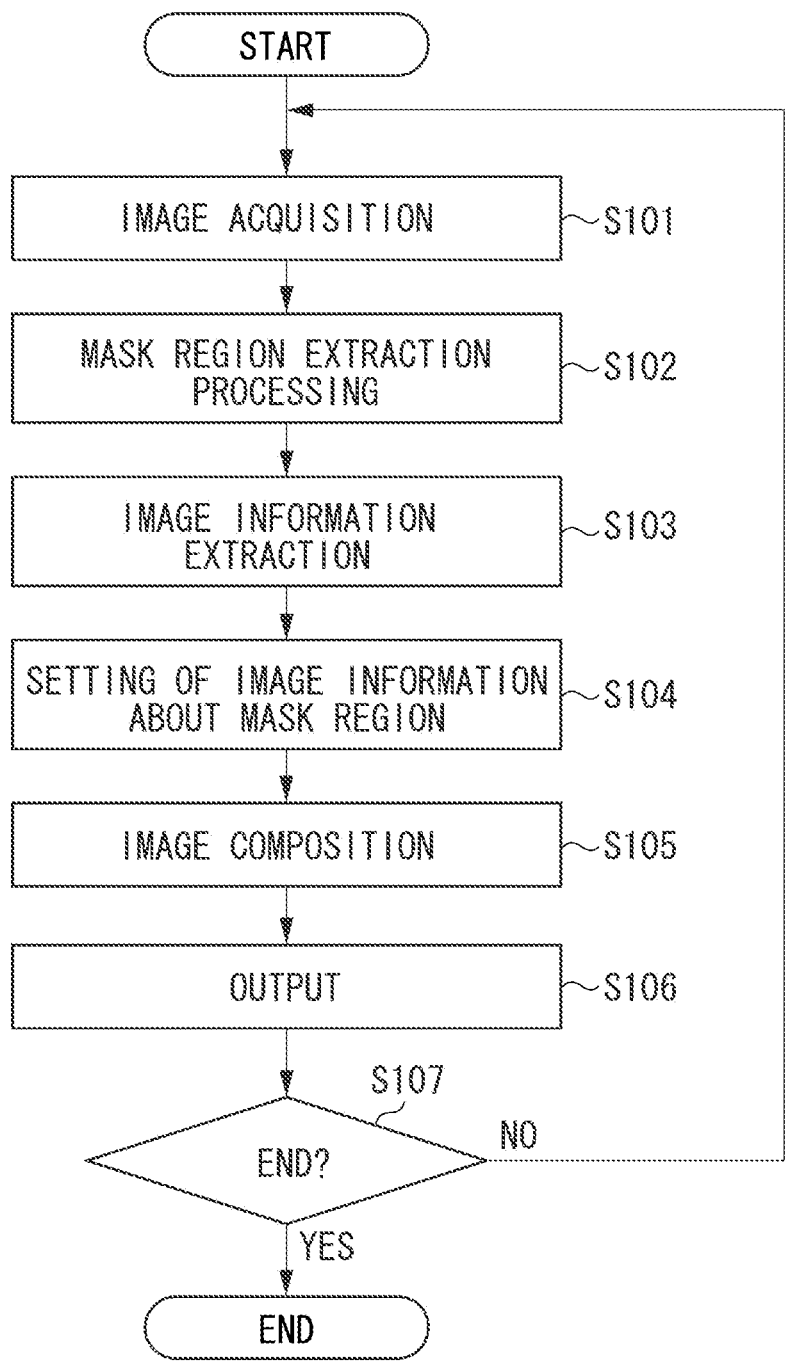
FIG. 3 is a flowchart illustrating processing of the image processing apparatus.

FIG. 3 is a flowchart illustrating processing that improves visibility of a shape of a person in the continuously-provided images while obscuring the person and outputs the resultant images.

Figure 4:
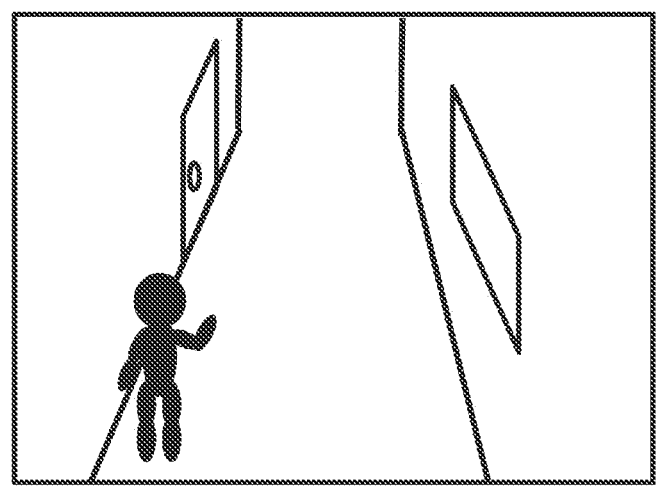
FIG. 4 is a diagram illustrating an example of a captured image.

After the processing is started, the image acquiring unit 101 acquires an image in step S101. The image acquiring unit 101 stores the acquired image in a memory such as the RAM 13 and the HDD 22. FIG. 4 illustrates an example of the image acquired by the image acquiring unit 101.

Figure 5:
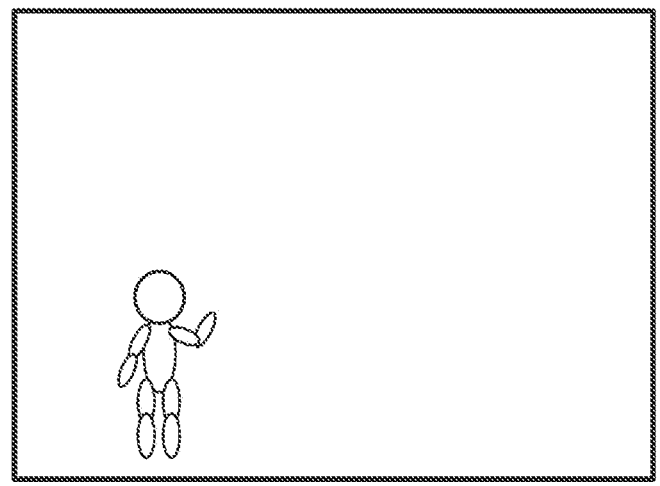
FIG. 5 is a diagram illustrating an example of a mask region of an object.

In step S102, the mask region extraction unit 102 extracts a mask region of an object from the image acquired by the image acquiring unit 101. FIG. 5 illustrates an example of the mask region of the object extracted by the mask region extraction unit 102.

In step S103, the image information setting unit 103 extracts color information as the image information about the background image. At this time, the image information setting unit 103 can extract color information about the entire background image or can extract color information about a region corresponding to the mask region. In addition, the image information setting unit 103 may select a region depending on a state. For example, the image information setting unit 103 can extract color information about the entire background image at the start of the processing of the image processing apparatus 100 and can extract color information about a region corresponding to the mask region after the processing is started.

In step S104, the image information setting unit 103 selects a color that is different from the extracted color and is easily discriminable from the background color, and sets the selected color as color information about the mask region, thereby generating a mask image.

Figure 6:
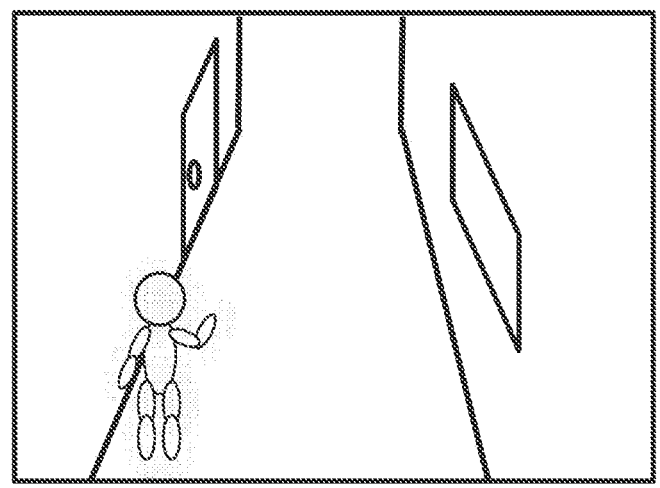
FIG. 6 is a diagram illustrating an example of a composite image.

In step S105, the image composition unit 104 composes a composite image of the background image and the mask image to generate a privacy protection image. FIG. 6 illustrates an example of the privacy protection image generated by the image composition unit 104.

In step S106, the output unit 105 outputs the generated privacy protection image to the external apparatus and the like.

In step S107, the output unit 105 determines whether an end instruction has been received from the PD 19, the KB 20, or the like. When the output unit 105 determines that the end instruction has been received (YES in step S107), the processing of the flowchart illustrated in FIG. 3 ends. When the output unit 105 determines that the end instruction has not been received (NO in step S107), the processing returns to step S101.

As described above, the image processing apparatus extracts the mask region and sets, as the masking color, a color (a color with high attractiveness and high visibility) that is easily discriminable from the background image in order to improve visibility of the shape and the outline of a person. The mask image is an image subjected to obscuring (image processing to prevent an individual from being discriminated) in order to protect privacy of the object. Since the processing of replacing the color of the object region is performed as the image processing, the object image is masked but the presence and the motion of the object are easily recognizable. As described above, the mask image is required to be easily discriminable from the background image in order to enable the object to be easily recognized and to enable the motion of the object to be grasped.

In the first exemplary embodiment, the color is described as an example of the image information different between the background image and the mask image. The image information is not limited to the color information, and an image pattern, a line type, and the like that are the image information for generating the mask image can be used.

When the image information about the background region corresponding to the mask region includes a plurality of pieces of color information, the image information setting unit 103 sets color information about a single color as the color of the mask region. More specifically, the image information setting unit 103 sets, as the color information about the color of the mask region, color information about a single color different from the color that is used in the widest area of the background image corresponding to the mask region, from among the colors indicated by the plurality of pieces of color information. This enables setting the masking color different for each frame, and executing the masking processing based on the different masking color.

The image information setting unit 103 can select the image information about the mask region based on the image information about the mask region selected in a previous frame and the image information about the background image in a current frame. This method prevents the color of the mask image from being changed for each frame, and enables a user to easily recognize the masked object.

Figure 7:
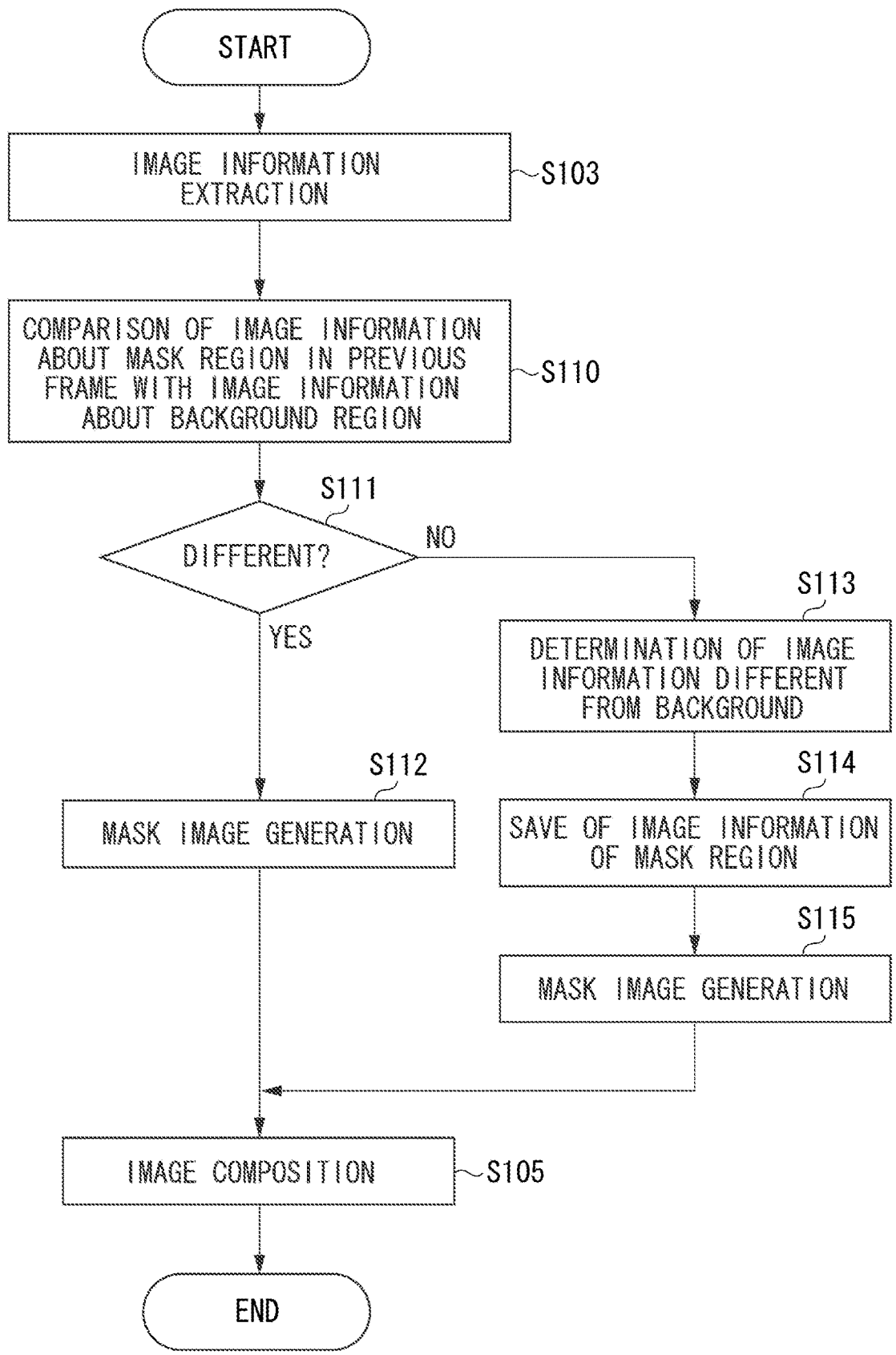
FIG. 7 is a flowchart illustrating information processing from step S103 to step S105 in detail.

FIG. 7 is a flowchart illustrating the information processing from step S103 to step S105 in FIG. 3 in detail.

In step S103, the image information setting unit 103 extracts color information as the image information about the background image.

In step S110, the image information setting unit 103 compares the image information about the background image extracted in step S103 with the image information about the mask region set in the previous frame.

In step S111, the image information setting unit 103 determines whether the two pieces of image information are different from each other as a result of the comparison. When the image information setting unit 103 determines that the two pieces of image information are different from each other (YES in step S111), the processing proceeds to step S112. When the image information setting unit 103 determines that the two pieces of image information are not different from each other (NO in step S111), the processing proceeds to step S113.

In step S112, the image information setting unit 103 sets, as the color information about the mask region in the current frame, the color information that is image information about the mask region set in the previous frame, and generates a mask image.

The case where the two pieces of image information are not different from each other corresponds to a case where discrimination is difficult. Therefore, the image information setting unit 103 newly determines the color information about a color different from the color of the background in step S113.

In step S114, the image information setting unit 103 saves the newly-determined color information about the mask region.

In step S115, the image information setting unit 103 generates a mask image based on the newly-determined color information about the mask region.

In step S105, the image composition unit 104 composes a composite image of the background image and the mask image to generate a privacy protection image.

The information processing according to the first exemplary embodiment enables monitoring in consideration of privacy of a person and the like, and enables displaying the mask image corresponding to the state. As a result, the masked person is easily recognized, which reduces a burden of a monitor.

Figure 8:
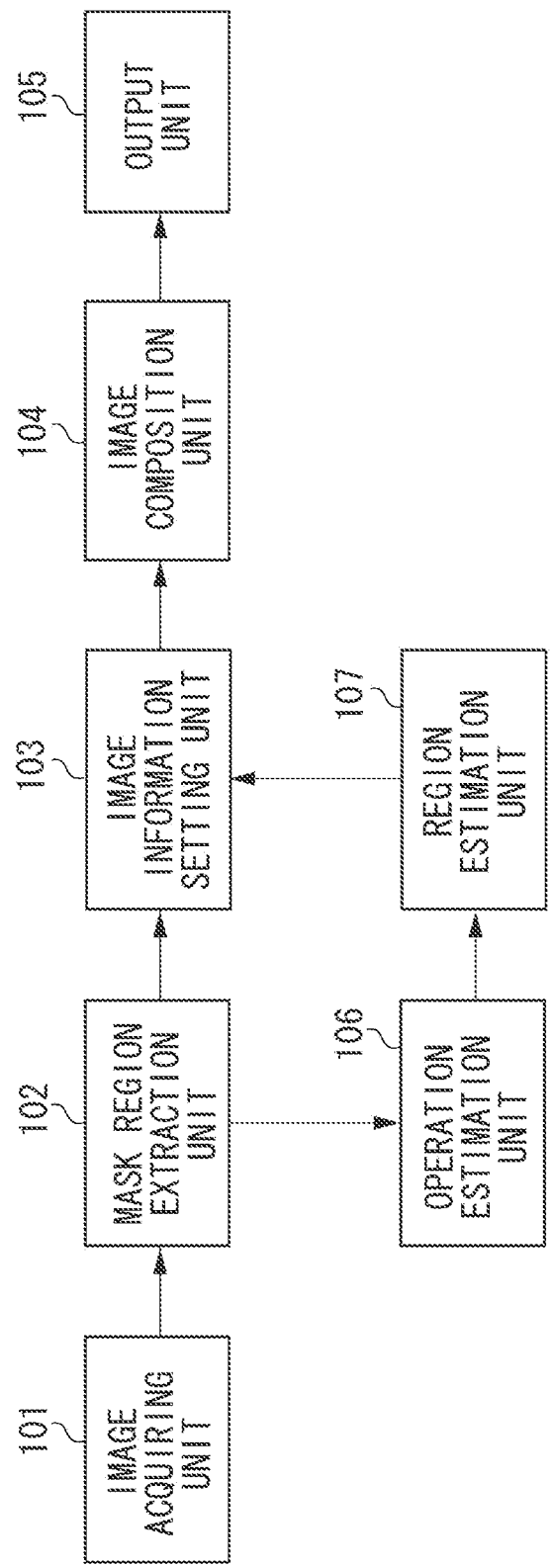
FIG. 8 is a diagram illustrating a software configuration of an image processing apparatus.

FIG. 8 is a diagram illustrating an example of a software configuration of the image processing apparatus 100 according to a second exemplary embodiment. The image processing apparatus 100 includes, as the software configuration, the image acquiring unit 101, the mask region extraction unit 102, the image information setting unit 103, the image composition unit 104, the output unit 105, an operation estimation unit 106, and a region estimation unit 107. Description of components of the software configuration similar to those of the first exemplary embodiment is omitted.

The operation estimation unit 106 receives, from the mask region extraction unit 102, object information that is a privacy protection target. The operation estimation unit 106 performs tracking processing of the object to estimate a position of the object in a subsequent frame, based on the object information for each frame. The operation estimation unit 106 transmits the estimated object position to the region estimation unit 107.

The region estimation unit 107 estimates a region to be masked, from the estimated object position, and acquires the image information about the background image corresponding to the estimated region. The region estimation unit 107 transmits the image information about the acquired estimated region to the image information setting unit 103.

The image information setting unit 103 sets the image information about the mask region based on the image information about the background image corresponding to the mask region received from the mask region extraction unit 102 and the image information received from the region estimation unit 107.

Figure 9:
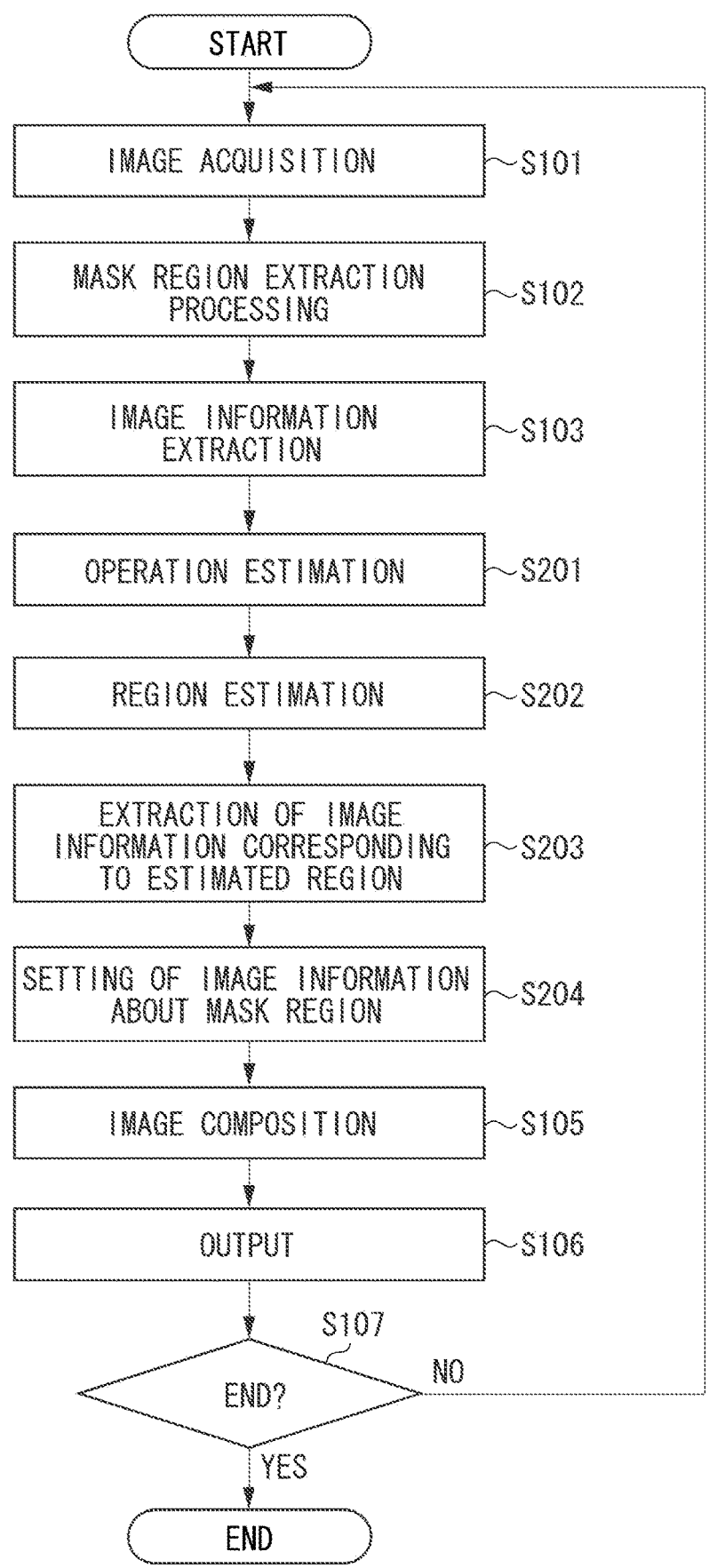
FIG. 9 is a flowchart illustrating processing of the image processing apparatus.

FIG. 9 is a flowchart illustrating an example of the information processing of the image processing apparatus 100 according to the second exemplary embodiment that generates a privacy protection image from the images continuously provided and outputs the privacy protection image. Description of the processes similar to the processes of the first exemplary embodiment is omitted.

The image information corresponding to the mask region in the current frame is extracted through the processes up to step S103.

In step S201, the operation estimation unit 106 performs the tracking processing of the object as a foreground and estimates the object position in the subsequent frame.

In step S202, the region estimation unit 107 estimates a region corresponding to the estimated object position.

In step S203, the region estimation unit 107 extracts the image information about the background region corresponding to the estimated region.

In step S204, the image information setting unit 103 sets the image information about the mask region that is different from the image information extracted by the region estimation unit 107 and the image information corresponding to the mask region, and generates the mask image. At this time, when the image information about the mask region in the previous frame is information that is different from the image information extracted by the region estimation unit 107 and the image information corresponding to the mask region, the image information setting unit 103 sets the image information about the mask region in the previous frame and generates the mask image.

According to the information processing of the second exemplary embodiment, the color of the mask region is determined based on the color information about the background image and the color information about the mask region in which the object position in the subsequent frame is estimated. This eliminates frequent color change of the mask region for each frame. Therefore, a privacy protection image that prevents missing of the object to be masked is generated.

One or more functions of the above-described exemplary embodiments are achievable by supplying programs to a system or an apparatus via a network or a storage medium and causing one or more processors in a computer of the system or the apparatus to load and execute the programs. The one or more functions are also achievable by a circuit, e.g., an application specific integrated circuit (ASIC).

While some exemplary embodiments have been described in detail hereinbefore, these specific exemplary embodiments are not seen to be limiting.

For example, a part or all of the software configuration of the image processing apparatus 100 can be implemented as a hardware configuration of the image processing apparatus 100. In addition, the hardware configuration of the image processing apparatus 100 is an example, and the PD 19, the KB 20, the CRT 21, the HDD 22, and other components can be external to the image processing apparatus 100.

In the description of the above-described exemplary embodiments, the image information setting unit 103 sets the image information and generates the mask image. Alternatively, the image information setting unit 103 can set the image information, and the image composition unit 104 can generate the mask image based on the set image information and the like, and can generate the privacy protection image from the mask image and the background image. In addition, the image composition unit 104 can include all the functions of the image information setting unit 103. In other words, the image composition unit 104 can set the image information, generate the mask image, and generate the privacy protection image from the mask image and the background image.

The processing according to the exemplary embodiments provides a monitoring video achieving both privacy protection and monitoring.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-215301, filed Nov. 2, 2016, and No. 2017-149980, filed Aug. 2, 2017, which are hereby incorporated by reference herein in their entirety.

What is claimed is:

1. An image processing apparatus, comprising:
a computer executing instructions that, when executed by the computer, cause the computer to function as:
an acquiring unit configured to acquire a background image and a captured image;
an extraction unit configured to extract, from the captured image, an object region corresponding to a predetermined object;
a first generation unit configured to generate a mask image for privacy protection on the object region; and
a second generation unit configured to generate a composite image by combining the mask image generated by the first generation unit and the background image acquired by the acquiring unit,
wherein the first generation unit extracts a plurality of pieces of color information from the background image, sets color information indicating single color based on the plurality of pieces of color information, and generates the mask image based on the set color information.

2. The image processing apparatus according to claim 1, wherein the first generation unit sets color information indicating a single color that is different from a color most used in a region of the background image corresponding to the object region from among colors indicated by the plurality of pieces of color information.

3. The image processing apparatus according to claim 1, further comprising an output unit configured to output the composite image.

4. The image processing apparatus according to claim 1, wherein the first generation unit generates the mask image by masking the object region based on the single color indicated by the set color information.

5. An image processing method, comprising:
acquiring a background image and a captured image;
extracting an object region corresponding to a predetermined object from the captured image;
firstly generating a mask image for privacy protection on the object region; and
secondly generating a composite image by combining the mask image and the background image,
wherein the firstly generating extracts a plurality of pieces of color information from the background image, sets color information indicating single color based on the plurality of pieces of color information, and generates the mask image based on the set color information.

6. A non-transitory computer-readable storage medium storing a program that causes a computer execute an image processing method, the image processing method comprising:
acquiring a background image and a captured image;
extracting an object region corresponding to a predetermined object from the captured image;
firstly generating a mask image for privacy protection on the object region; and
secondly generating a composite image by combining the mask image and the background image,
wherein the firstly generating extracts a plurality of pieces of color information from the background image, sets color information indicating single color based on the plurality of pieces of color information, and generates the mask image based on the set color information.

7. An image processing apparatus, comprising:
a computer executing instructions that, when executed by the computer, cause the computer to function as:
an acquiring unit configured to acquire a background image and a target image which is captured by an imaging unit;
an extraction unit configured to extract, from the target image, an object region corresponding to a predetermined object;
a first generation unit configured to generate a mask image for privacy protection on the object region; and
a second generation unit configured to generate a composite image by combining the mask image generated by the first generation unit and the background image acquired by the acquiring unit,
wherein the first generation unit generates the mask image, for the privacy protection on the object region, based on first color information about the background image and second color information used for generating the mask image for the privacy protection on the object region extracted from a previous image of the target image.

8. The image processing apparatus according to claim 7,
wherein the first color information about the background image includes first color information about the background image corresponding to the object region extracted from the target image,
wherein, if the first color information about the background image corresponding to the object region extracted from the target image is different from the second color information, the first generation unit generates the mask image, for the privacy protection on the object region extracted from the target image, by using the second color information, and
wherein, if the first color information about the background image corresponding to the object region extracted from the target image is not different from the second color information, the first generation unit generates the mask image, for the privacy protection on the object region extracted from the target image, by using third color information different from the first color information about the background image corresponding to the object region extracted from the target image.

9. The image processing apparatus according to claim 8,
wherein, if the first color information about the background image corresponding to the object region extracted from the target image is different from the second color information, the first generation unit generates the mask image by masking the object region, extracted from the target image, based on the second color information, and
wherein, if the first color information about the background image corresponding to the object region extracted from the target image is not different from the second color information, the first generation unit generates the mask image by masking the object region, extracted from the target image, based on the third color information.

10. An image processing apparatus, comprising:
a computer executing instructions that, when executed by the computer, cause the computer to function as:
an acquiring unit configured to acquire a background image and a target image which is captured by an imaging unit;
an extraction unit configured to extract, from the target image, an object region corresponding to a predetermined object;
a first generation unit configured to generate a mask image for privacy protection on the object region;
a second generation unit configured to generate a composite image by combining the mask image generated by the first generation unit and the background image acquired by the acquiring unit; and
an estimation unit configured to estimate a region corresponding to the predetermined object in a subsequent image of the target image,
wherein the first generation unit generates the mask image, for the privacy protection on the object region, based on first color information about the background image corresponding to the object region and second color information about the background image corresponding to the estimated region estimated by the estimation unit.

11. The image processing apparatus according to claim 10,
wherein the first generation unit generates the mask image based on third color information which is different from the first color information and the second color information.

12. The image processing apparatus according to claim 11,
wherein the first generation unit generates the mask image by masking the object region, extracted from the target image, based on the third color information.

13. An image processing method, comprising:
acquiring a background image and a target image which is captured by an imaging unit;
extracting, from the target image, an object region corresponding to a predetermined object;
firstly generating a mask image for privacy protection on the object region; and
secondly generating a composite image by combining the mask image and the background image,
wherein the firstly generating generates the mask image, for the privacy protection on the object region, based on first color information about the background image and second color information used for generating the mask image for the privacy protection on the object region extracted from a previous image of the target image.

14. A non-transitory computer-readable storage medium storing a program that causes a computer execute an image processing method, the image processing method comprising:
acquiring a background image and a target image which is captured by an imaging unit;
extracting, from the target image, an object region corresponding to a predetermined object;
firstly generating a mask image for privacy protection on the object region; and
secondly generating a composite image by combining the mask image and the background image,
wherein the firstly generating generates the mask image, for the privacy protection on the object region, based on first color information about the background image and second color information used for generating the mask image for the privacy protection on the object region extracted from a previous image of the target image.

15. An image processing method, comprising:
acquiring a background image and a target image which is captured by an imaging unit;
extracting, from the target image, an object region corresponding to a predetermined object;
firstly generating a mask image for privacy protection on the object region;
secondly generating a composite image by combining the mask image and the background image; and
estimating a region corresponding to the predetermined object in a subsequent image of the target image;
wherein the firstly generating generates the mask image, for the privacy protection on the object region, based on first color information about the background image corresponding to the object region and second color information about the background image corresponding to the estimated region estimated in the estimating.

16. A non-transitory computer-readable storage medium storing a program that causes a computer execute an image processing method, the image processing method comprising:
acquiring a background image and a target image which is captured by an imaging unit;
extracting, from the target image, an object region corresponding to a predetermined object;
firstly generating a mask image for privacy protection on the object region;
secondly generating a composite image by combining the mask image and the background image; and
estimating a region corresponding to the predetermined object in a subsequent image of the target image;
wherein the firstly generating generates the mask image, for the privacy protection on the object region, based on first color information about the background image corresponding to the object region and second color information about the background image corresponding to the estimated region estimated in the estimating.

* * * * *